US012749268B2

(12) United States Patent
Lee et al.

(10) Patent No.: US 12,749,268 B2
(45) Date of Patent: Sep. 29, 2026

(54) TRAINING AND INFERENCE METHOD FOR GENERATING STYLIZED 3D MESH AND DEVICE FOR THE SAME

(71) Applicant: POSTECH RESEARCH AND BUSINESS DEVELOPMENT FOUNDATION, Pohang-si (KR)

(72) Inventors: Seungyong Lee, Pohang-si (KR); Wonjong Jang, Pohang-si (KR); Hyomin Kim, Pohang-si (KR); Yucheol Jung, Pohang-si (KR)

(73) Assignee: POSTECH RESEARCH AND BUSINESS DEVELOPMENT FOUNDATION, Pohang-si (KR)

( * ) Notice: Subject to any disclaimer, the term of this patent is extended or adjusted under 35 U.S.C. 154(b) by 88 days.

(21) Appl. No.: 18/908,371

(22) Filed: Oct. 7, 2024

(65) Prior Publication Data

US 2025/0131652 A1 Apr. 24, 2025

(30) Foreign Application Priority Data

Oct. 20, 2023 (KR) ........................ 10-2023-0141536
Aug. 19, 2024 (KR) ........................ 10-2024-0110856

(51) Int. Cl.
*G06T 17/20* (2006.01)
*G06T 3/4007* (2024.01)
(Continued)

(52) U.S. Cl.
CPC ............ *G06T 17/20* (2013.01); *G06T 3/4007* (2013.01); *G06T 3/4046* (2013.01); *G06T 7/50* (2017.01);
(Continued)

(58) Field of Classification Search
CPC ..... G06T 17/20; G06T 3/4007; G06T 3/4046; G06T 7/50; G06T 15/02;
(Continued)

(56) References Cited

U.S. PATENT DOCUMENTS

2022/0292773 A1 9/2022 Liu et al.
2024/0029345 A1 1/2024 Selvert et al.

FOREIGN PATENT DOCUMENTS

KR 20230097157 A 6/2023
KR 20240061220 A 5/2024

OTHER PUBLICATIONS

Shi et al. "Lifting 2D StyleGAN for 3D-aware face generation", arXiv:2011.13126v2, 2021 (Year: 2021).*
(Continued)

*Primary Examiner* — Yingchun He
(74) *Attorney, Agent, or Firm* — Morgan, Lewis & Bockius LLP

(57) ABSTRACT

A stylized 3D mesh generation device may comprise: a memory for storing at least one or more instructions; a processor for executing the at least one or more instructions; a first neural network for generating a per-pixel feature vector based on a 2D input image and a target style; and a second neural network for generating a surface normal map corresponding to a 3D mesh of the 2D input image based on the per-pixel feature vector, wherein the processor generates a stylized 3D mesh of the 2D input image based on the surface normal map, and the second neural network generates and outputs the surface normal map applied with the target style based on the per-pixel feature vector.

20 Claims, 14 Drawing Sheets

(51) Int. Cl.
*G06T 3/4046* (2024.01)
*G06T 7/50* (2017.01)
*G06T 15/02* (2011.01)

(52) U.S. Cl.
CPC .... *G06T 15/02* (2013.01); *G06T 2207/20016* (2013.01); *G06T 2207/20081* (2013.01); *G06T 2207/20084* (2013.01); *G06T 2207/30201* (2013.01)

(58) Field of Classification Search
CPC . G06T 2207/20016; G06T 2207/20081; G06T 2207/20084; G06T 2207/30201; G06T 2219/2021; G06T 2219/2024; G06T 19/20
See application file for complete search history.

(56) References Cited

OTHER PUBLICATIONS

Pan et al. "Do 2D GANs know 3D shape? unsupervised 3D shape reconstruction from 2D image GANs", arXiv:2011.00844v4, 2021 (Year: 2021).*
Wang et al. ("3D Cartoon Face Generation with Controllable Expressions from a Single GAN Image", arXiv:2207.14425v1, 2022 (Year: 2022).*
Pinkney et al. ("Resolution dependent GAN interpolation for controllable image synthesis between domains", arXiv:2010.053334v3, 2020 (Year: 2020).*

* cited by examiner

Cartoon

Caricature

Ukiyo-e

+ smile

TRAINING AND INFERENCE METHOD FOR GENERATING STYLIZED 3D MESH AND DEVICE FOR THE SAME

CROSS-REFERENCE TO RELATED APPLICATIONS

This application claims priority to Korean Patent Application No. 10-2023-0141536, filed on Oct. 20, 2023, and Korean Patent Application No. 10-2024-0110856, filed on Aug. 19, 2024, with the Korean Intellectual Property Office (KIPO), the entire contents of each of which are hereby incorporated by reference.

BACKGROUND

1. Technical Field

The present disclosure relates to a training and inference method for generating a stylized 3D mesh and a device therefor, and particularly, to a 3D facial shape generation technique applicable to various style domains even when training is performed on a normal face.

2. Related Art

Recently, owing to advancement in Generative Adversarial Networks (GAN), high-quality face stylization has come to be possible. Toonify is one of popular approaches to face stylization based on StyleGAN. Although the Toonify generates stylized faces by exaggerating large and plausible shapes, these interesting shapes are only represented as 2D color images.

It is difficult to synthesize a 3D shape from stylized face images. Reconstruction has an ill-posed characteristic, and data-based reconstruction is not easy since it is difficult to obtain a 3D stylized face as ground-truth data. In the prior art, skilled 3D artists are relied on to perceptually mimic the appearance of a stylized face in many cases. For example, a 3D caricature dataset can be constructed by asking a 3D artist to sculpt a mesh model corresponding to a 2D caricature. However, the method of manually constructing such a dataset is not scalable.

Recent studies on 3D-lifting GAN and 3D-aware GAN provide a fully self-supervised approach to obtain a 3D shape from images generated by the GAN. However, the main goal of the self-supervised approach is not accurate 3D reconstruction, but synthesis of an image with 3D-consistency. In addition, the self-supervised approach applied to both a normal face and a stylized face may generate a 3D shape smooth or noisy around facial components.

SUMMARY

An object of the present disclosure is to provide a device and method for generating a stylized 3D mesh from a Toonify image by synthesizing a stylized shape that faithfully describes the characteristics of a Toonify result, and converting the Toonify image into a 3D image (face).

Another object of the present disclosure is to provide a device and method capable of estimating a surface normal by utilizing features of StyleGAN.

Another object of the present disclosure is to provide a device and method capable of providing a 3D mesh for a stylized face when inference is performed although training is performed using a normal face. That is, the object is to provide a device and method capable of obtaining a 3D mesh by replacing with various style domain models at the location of a first neural network of the present disclosure.

In addition, another object of the present disclosure is to provide a method capable of providing a clean 3D surface of a face generated by the GAN.

In addition, another object of the present disclosure is to provide a method capable of estimating a consistent surface normal even when the lighting direction of a face changes.

According to a first exemplary embodiment of the present disclosure, a stylized 3D mesh generation device may comprise: a memory for storing at least one or more instructions; a processor for executing the at least one or more instructions; a first neural network for generating a per-pixel feature vector based on a 2D input image and a target style; and a second neural network for generating a surface normal map corresponding to a 3D mesh of the 2D input image based on the per-pixel feature vector, wherein the processor generates a stylized 3D mesh of the 2D input image based on the surface normal map, and the second neural network generates and outputs the surface normal map applied with the target style based on the per-pixel feature vector.

When training of the second neural network is performed, the first neural network may generate the per-pixel feature vector based on a first target style, and the first target style may be applied to the generated surface normal map.

When inference of the second neural network is performed, the first neural network may generate the per-pixel feature vector based on a second target style, and the second target style may be applied to the generated surface normal map.

The first target style may be a normalized style, and the second target style may be any one among animation, cartoon, caricature, or a special painting style.

The stylized 3D mesh generation device may further comprise, between the first neural network and the second neural network, a feature map pyramid including feature maps extracted from the first neural network, wherein the processor may adjust a size of each feature map of the feature map pyramid to a size of the surface normal map using bilinear interpolation, and the processor may generate the per-pixel feature vector by linking and normalizing features across all feature maps of the feature map pyramid at each pixel location of the 2D input image.

The first neural network may further receive images having lighting conditions different from each other, and may generate a per-pixel second feature vector v1 or v2 of the 2D input image for each of the images, and the second neural network may generate a surface normal map corresponding to the 3D mesh of the 2D input image based on the per-pixel feature vector and the per-pixel second feature vector.

The 2D input image may be generated by converting a pose of an object included in a first image into a front pose, and the processor may convert the generated surface normal map of the object into a depth map, detect a landmark of the object, and generate a full-head 3D object applied with the target style by aligning a full-head template mesh to a partial surface where the detected landmark is located, based on the depth map.

The processor may generate a stylized 3D image of the 2D input image by rendering the 3D mesh.

According to a second exemplary embodiment of the present disclosure, a training method for generating a stylized 3D mesh may comprise: inputting a training-purpose 2D input image into a first neural network, and generating a per-pixel feature vector from the training-purpose 2D input image based on a first target style; inputting the per-pixel feature vector into a second neural network, and training the second neural network to generate and output a surface normal map corresponding to a 3D mesh of the training-purpose 2D input image; providing a new first neural network applied with a second target style; and providing the new first neural network and second neural network to generate a surface normal map applied with the second target style in an inference-purpose 2D input image.

The first target style may be a normalized style.

The new first neural network may be provided by finely tuning the first neural network to apply the second target style, which is any one among animation, cartoon, caricature, or a special painting style.

The step of generating a per-pixel feature vector may include: outputting an intermediate image using the first neural network; adjusting a size of each feature map of a feature map pyramid to a size of the surface normal map using bilinear interpolation, by passing the intermediate image through the feature map pyramid including feature maps extracted from the first neural network; and generating the per-pixel feature vector by linking and normalizing features across all feature maps of the feature map pyramid at each pixel location of the training-purpose 2D input image.

The training method for generating a stylized 3D mesh may further comprise: inputting images having lighting conditions different from each other into the first neural network and generating a per-pixel second feature vector of the training-purpose 2D input image for each of the images, wherein the step of training the second neural network may be a step of training to generate and output the surface normal map by inputting the per-pixel feature vector and the per-pixel second feature vector into the second neural network.

The step of training the second neural network may be a step of inputting the per-pixel feature vector into the second neural network, and training the second neural network to output the surface normal map using a surface normal map rendered for the previously prepared training-purpose 2D input image as a ground-truth label.

According to a third exemplary embodiment of the present disclosure, an inference method for generating a stylized 3D mesh may comprise: inputting a 2D input image into a first neural network, and generating a per-pixel feature vector based on the 2D input image and a target style; inputting the per-pixel feature vector into a second neural network, and generating and outputting the surface normal map applied with the target style as a surface normal map corresponding to a 3D mesh of the 2D input image; and generating a stylized 3D mesh of the 2D input image based on the surface normal map.

The second neural network may be a neural network that has been trained a function of generating a surface normal map corresponding to the 3D mesh of the 2D input image when the first neural network may generate a per-pixel feature vector based on a training-purpose target style, which is a normalized style.

The target style may be any one style among animation, cartoon, caricature, or a special painting style.

The step of generating a per-pixel feature vector may include: outputting an intermediate image using the first neural network; adjusting a size of each feature map of a feature map pyramid to a size of the surface normal map using bilinear interpolation, by passing the intermediate image through the feature map pyramid including feature maps extracted from the first neural network; and generating the per-pixel feature vector by linking and normalizing features across all feature maps of the feature map pyramid at each pixel location of the 2D input image.

The inference method for generating a stylized 3D mesh may further comprise: generating the 2D input image by converting a pose of an object included in the first image into a front pose, and the step of generating a 3D image may include: converting the generated surface normal map into a depth map; detecting a landmark of the object; and generating a full-head 3D object applied with the target style by aligning a full-head template mesh to a partial surface where the detected landmark is located, based on the depth map.

The inference method for generating a stylized 3D mesh may further comprise: generating a 3D image by rendering the full-head 3D object.

According to the present disclosure, a device and method for generating a stylized 3D mesh from a Toonify image by synthesizing a stylized shape that faithfully describes the characteristics of a Toonify result, and converting the Toonify image into a 3D image (face) can be provided.

According to the present disclosure, surface normals can be estimated by utilizing features of StyleGAN.

According to the present disclosure, although training is performed using a normal face, a 3D mesh for a stylized face may be provided when inference is performed. That is, a 3D mesh can be obtained by replacing with various style domain models at the location of the first neural network of the present disclosure.

According to the present disclosure, a clean 3D surface of a face generated by GAN can be generated and provided.

According to the present disclosure, a consistent surface normal can be estimated even when the lighting direction of the face changes.

According to the present disclosure, various 3D stylized full-head mesh avatars can be generated.

According to the present disclosure, more accurate surface normal estimation can be achieved with a limited training dataset.

According to the present disclosure, a 3D facial expression editing function for 3D stylized avatars can be provided.

DETAILED DESCRIPTION OF THE EMBODIMENTS

Figure 1:
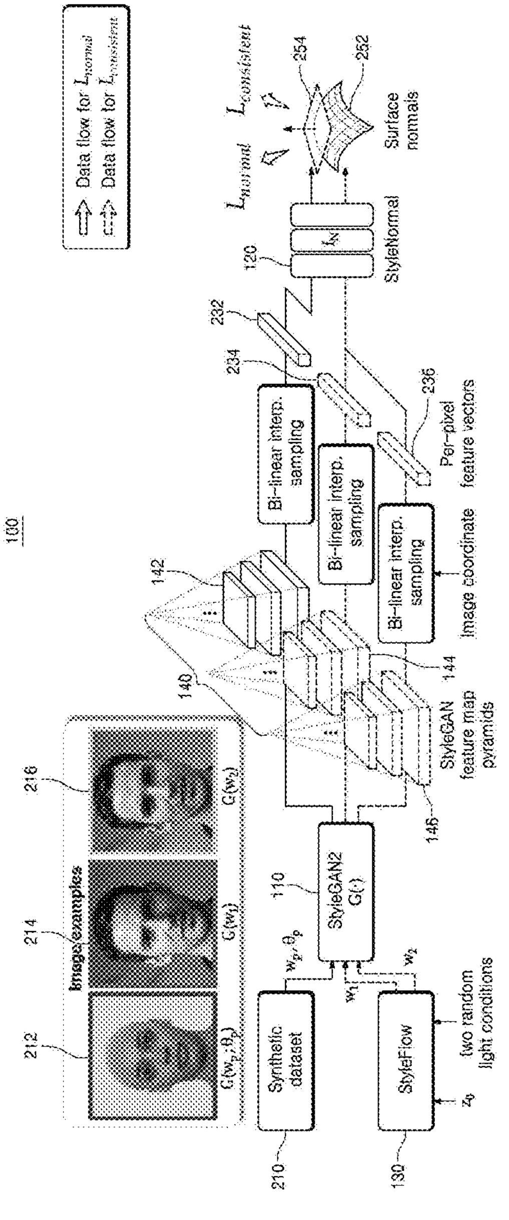
FIG. 1 is a view for explaining a process of generating a surface normal map applied with a target style according to an embodiment of the present disclosure.

While the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may refer to "at least one A or B" or "at least one of one or more combinations of A and B". In addition, "one or more of A and B" may refer to "one or more of A or B" or "one or more of one or more combinations of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e., "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

FIG. 1 is a view for explaining a process of generating a surface normal map applied with a target style according to an embodiment of the present disclosure.

An object according to an embodiment of the present disclosure is to provide a stylized 3D mesh generation device 100 including a neural network that achieves various 3D-liftings for both a normal face, for example, generated from the StyleGAN and a stylized face, for example, generated from the Toonify.

The 3D mesh generation device 100 may include a processor (not shown), a first neural network 110, and a second neural network 120.

The first neural network 110 may be a neural network that outputs images of a normalized style, a cartoon style, or a caricature style, such as StyleGAN or StyleGAN2. For example, the first neural network 110 may be Toonify.

The first neural network 110 may generate a per-pixel feature vector based on a 2D input image and a target style.

The second neural network 120 may generate and output a surface normal map 252 corresponding to the 3D mesh of the 2D input image based on the per-pixel feature vector 232 finally generated through the first neural network 110. That is, the second neural network 120 may generate and output the surface normal map applied with the target style based on the per-pixel feature vector. 3D facial expressions are possible through the surface normal map, which is the output of the second neural network 120.

The processor may generate a stylized 3D mesh of the 2D input image based on the surface normal map (RGB image). At this point, the 3D mesh may be a 3D face mesh as shown in the third column of the second row in FIG. 9, or may be a mesh of a full-head 3D stylized face as shown in FIG. 10. Preferably, the 3D mesh may mean the mesh of a full-head 3D stylized face.

The second neural network 120 may be a small neural network designed as a 3D-lifting additional function added on the first neural network 110, for example, StyleGAN2 that generates 1024×1024 images.

The second neural network 120 may be configured of a multi-layer perceptron (MLP) regressor $f_N$ of four layers. For example, the second neural network may be a neural network having a network structure arranged in order of Linear (6080, 128), ReLU( ), LayerNorm (128), Linear (128, 128), ReLU( ), LayerNorm (128), Linear (128, 32), ReLU( ), LayerNorm (32), and Linear (32, 3).

In the present disclosure, the second neural network 120 is trained using only a first target style, for example, a normalized style (normal face), and is applied to a face reflecting a second target style (i.e., a face stylized in Toonify) to obtain a 3D stylized face geometry.

That is, when the second neural network 120 is trained, the first neural network 110 generates a per-pixel feature vector based on the first target style, and the first target style may be applied to the generated surface normal map. In addition, when inference of the second neural network 120 is performed, a new first neural network may generate a per-pixel feature vector based on the second target style, and the second target style may be applied to the generated surface normal map. At this point, the second target style may be any one style among animation, cartoon, caricature, or a special painting style.

Hereinafter, a process of training the second neural network 120 and a dataset for the same will be described.

The input for training the second neural network 120 is a per-pixel feature vector v ($v \in R^{6080}$) (232), and the output is a surface normal map n ($n \in R^3$) corresponding to the per-pixel feature vector v. The dataset 210 may be prepared as samples including an input image needed to generate the per-pixel feature vector and a surface normal map as a ground-truth label for the input image.

For example, the dataset 210 may be constructed using 3D-scanned human data of 3DScanStore under the lighting condition in a natural environment. For example, color images of 10 3D-scanned humans may be generated, and 10 surface normal maps may be rendered.

At this point, the per-pixel feature vector v, which is the input of the second neural network 120, may be generated in a manner as shown below.

Each time the training is repeated on the input image (i.e., a synthetic image) of the dataset, a pair of latent code $w_p$ and network parameter $\theta_p$ obtained by performing GAN inversion on the input image may be sampled. The pair of latent code and network parameter may be input into the first neural network 110.

The first neural network 110 may receive the pair of latent code and network parameter as an input and generate and output a normalized style image.

The processor may generate per-pixel feature vectors 232 through bilinear interpolation by passing the generated normalized style image through a StyleGAN feature map pyramid 142 (hereinafter, referred to as a feature map pyramid).

At this point, the second neural network 120 may be trained using the ground-truth label. Image coordinates u inside the head region of the surface normal map output at the training step of the second neural network 120 may be randomly sampled. An estimated normal $f_N$ of the second neural network 120 may be updated using a loss function $L_{normal}$ as shown in Equation 1.

$$\mathcal{L}_{normal} = \mathbb{E}_{(v,n)\sim p_{data}}\left[\|f_N(v(u)) - n(u)\|_1\right] \quad \text{[Equation 1]}$$

At this point, v (u) and n (u) may be the per-pixel StyleGAN feature vector and the ground-truth surface normal vector sampled at image coordinates u, respectively.

At this point, a surface normal map is estimated for one lighting condition, the second neural network 120 may have a problem of outputting a different surface normal map each time the estimation is performed when the lighting conditions are different although the surface normal map is estimated for the same person. In the case of the same person, the same surface normal map should be estimated since the geometries are the same. Therefore, in a second embodiment, the second neural network 120 may be trained to effectively estimate the surface normal map under various lighting conditions to ensure consistency of the output of the second neural network 120. Therefore, like the photometric stereo that analyzes multiple images of an object under various lighting conditions, the second neural network 120 may output a consistent surface normal map for a single surface when the direction of light cast on the face changes.

To this end, the 3D mesh generation device 100 may further include a CNF block set 130 for synthesizing various lightings. For example, the CNF block set 130 may be StyleFlow, which provides an attribute condition-type latent space search method that supports light editing while preserving the fundamental geometries.

To construct a dataset in a second embodiment, for example, a total of 60 color images and 10 surface normal maps may be generated by rendering the color and normal images of 10 3D-scanned humans using Blender under lighting conditions of six different environments. During the training, pixels for which the surface normal maps are not rendered can be ignored.

The CNF block set 130 may receive, for example, a latent code $z_0$ of a Gaussian latent space and two random lighting conditions, and output a latent cod w1 or w2 of an intermediate latent space for each of the two random lighting conditions.

The preprocessing step for determining the two random lighting conditions may be as shown below.

First, the processor may randomly sample a set of latent codes $z_0$ from the Gaussian distribution. Thereafter, the processor may acquire five light-editing latent codes w by inputting each of the sampled latent codes into the CNF block set 130 reflecting preset values of five individual lighting directions (e.g., front, left, right, up, down). That is, latent codes w0, w1, w2, w3, and w4 applied with five lighting directions may be generated for each of the latent codes z. For example, when there are 10 latent codes, 50 light-editing latent codes may be used. When training of the second neural network 120 is performed, latent code z may be randomly sampled.

Five feature map pyramids (not shown) that introduce changes in the lighting of the feature vectors used for training of the second neural network 120 may be prepared using the five light-editing latent codes w.

Each time the training is repeated, the processor may randomly select two light-adjusted feature map pyramids $G(w_1)$ 144 and $G(w_2)$ 146 among the five feature map pyramids, and sample a sample per-pixel feature vector v1 from the feature map pyramid 144 and a sample per-pixel feature vector v2 from the feature map pyramid 146 at the same image coordinates u'.

The sample per-pixel feature vectors v1 and v2 may be input into the second neural network 120 and generate a surface normal map 254.

At this point, consistency loss $L_{consistent}$ that allows the surface normal map to be consistently generated according to the lighting direction may be expressed as shown in Equation 2.

$$\mathcal{L}_{consistent} = \mathbb{E}\left[\|f_N(v_1(u')) - f_N(v_2(u'))\|_1\right] \quad \text{[Equation 2]}$$

At this point, since the estimated normal $f_N$ ($v_1$) and $f_N$ ($v_2$) should represent the same fundamental local geometry regardless of the adjusted lighting, the consistency loss may force the estimated normals to be identical to each other.

In summary, the overall objective function for training the second neural network 120 may be expressed as shown in Equation 3.

$$\mathcal{L}_{f_N} = \mathcal{L}_{normal} + \lambda_{reg}\mathcal{L}_{consistent} \quad \text{[Equation 3]}$$

At this point, $\lambda_{reg}$ may be a hyperparameter for normal consistency loss.

According to a second embodiment, the normalization capability can be improved by ensuring the second neural network 120 to be exposed to several lighting conditions for an invisible single shape.

Figure 2:
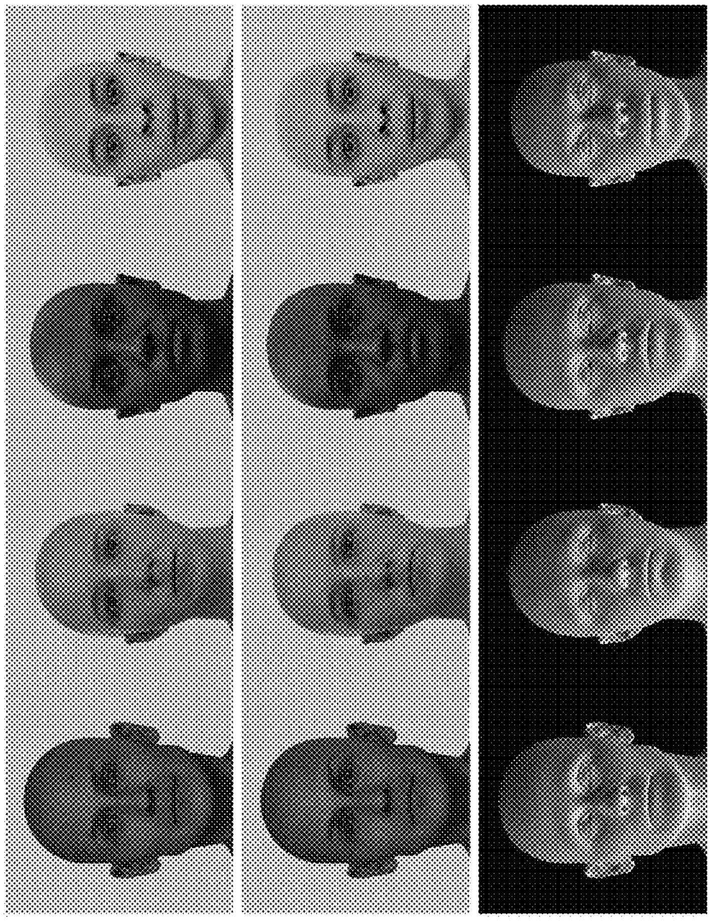
FIG. 2 is a view showing a synthetic dataset according to an embodiment of the present disclosure.

FIG. 2 is a view showing a synthetic dataset according to an embodiment of the present disclosure.

The first row of FIG. 2 shows rendered RGB images, the second row shows GAN projection results through Pivotal Tuning Inversion (PTI), and the third row shows rendered surface normals (i.e., surface normal maps).

That is, the images in the first row may be input images of the 3D mesh generation device 100 when training is performed, the images in the second row may be output images of the first neural network 110 applied with the PTI, and the images in the third row may be ground-truth images of the second neural network 120.

Referring to FIGS. 1 and 2 together, the second neural network 120 may be trained to output the surface normal maps 252, by inputting the per-pixel feature vector 232 into the second neural network 120, using a surface normal map (images in the third row) rendered for a previously prepared training-purpose 2D input image (images in the first row) as a ground-truth label.

Referring to the first to third rows together, it can be seen that the facial geometries are almost unchanged even after the GAN inversion. That is, as the pivotal tuning faithfully maintains the input appearances and attributes in the domain, per-pixel features may be aligned with the rendered surface normal maps.

Figure 3:
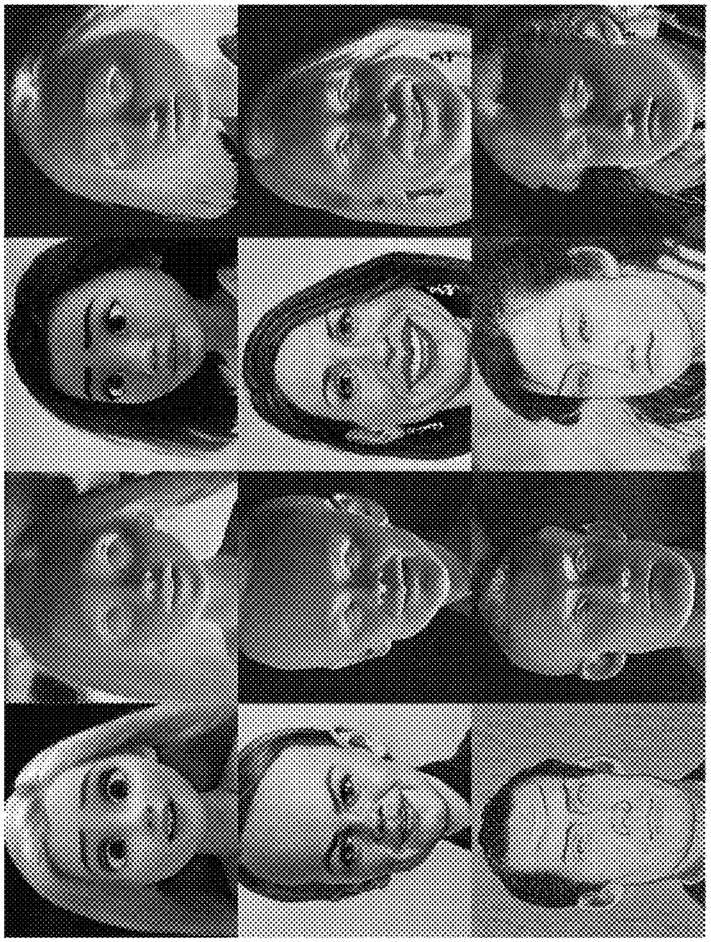
FIG. 3 is a view for explaining an inference example of a 3D mesh generation device according to an embodiment of the present disclosure.

FIG. 3 is a view for explaining an inference example of a 3D mesh generation device according to an embodiment of the present disclosure.

Hereinafter, it will be described with reference to FIG. 1 and FIG. 3 together.

When training of the second neural network 120 is complete, the first neural network 110 may be replaced with various Toonify models. For example, each of the various Toonify models may be trained with a different stylized face dataset.

The 3D mesh generation device 100 may generate a surface normal map for a stylized face by replacing the first neural network 110 with various Toonify models without any additional training.

For example, the Toonify model may be any one model among the models that generate style images such as cartoons, caricatures, Ukiyo-e, cubism, vintage comics, Edvard Munch, Mona Lisa, or the like.

In FIG. 3, the first and third columns show output images of the inference-purpose first neural network, and the second and fourth columns show surface normal maps, which are outputs of the second neural network for the output images of the first and third columns, respectively.

It can be seen that although the first neural network that reconstructs a normal face is used when training of the 3D mesh generation device 100 is performed, a stylized 3D mesh of a 2D input image as shown in FIG. 10 can be provided based on a surface normal map only by replacing the model when inference is performed.

Hereinafter, the background and motivation of the present disclosure will be described using FIGS. 4 and 5.

Figure 4:
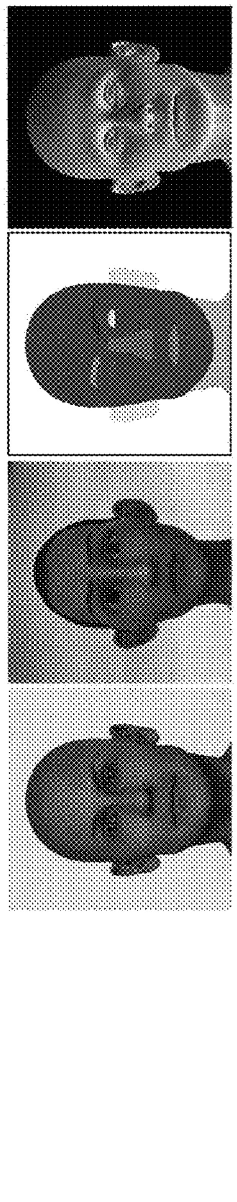
FIG. 4 is a view showing a normal face image, a stylized face image, a segmentation map image of a normal face, and a normal map image of a normal face according to an embodiment of the present disclosure.

FIG. 4 is a view showing a normal face image, a stylized face image, a segmentation map image of a normal face, and a normal map image of a normal face according to an embodiment of the present disclosure.

The first column shows a normal face image $c_r$ of feature vector $v_r$, the second column shows a stylized face image of feature vector $v_s$, the third column shows a segmentation map image $s_r$ of a normal face, and the fourth column shows a normal map image $n_r$ of a normal face.

Figure 5:
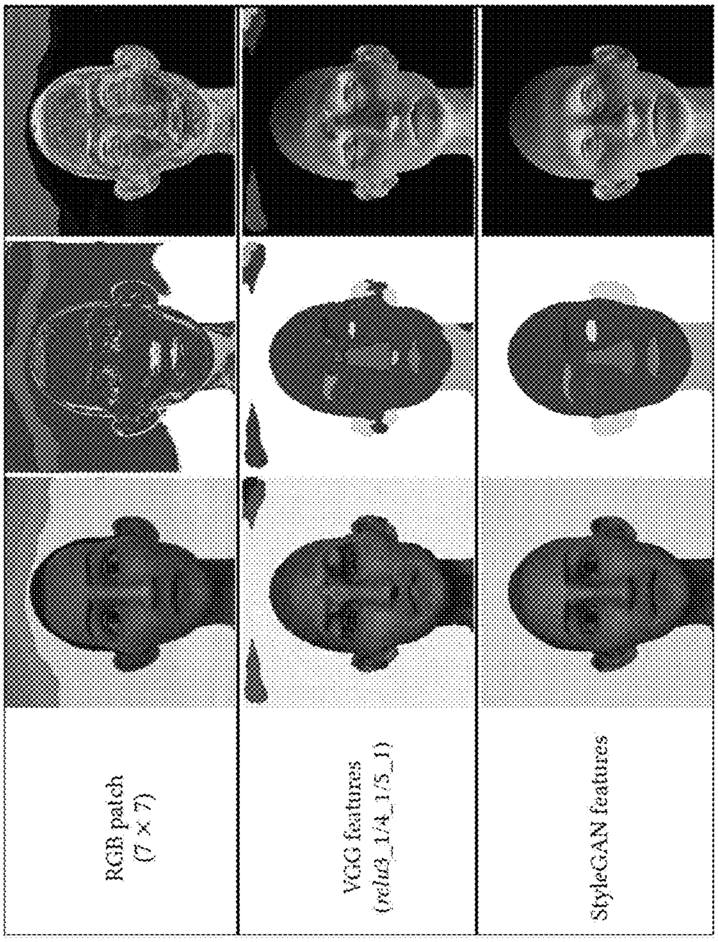
FIG. 5 is a view showing a result of performing nearest neighbor search in the StyleGAN feature space according to an embodiment of the present disclosure.

FIG. 5 is a view showing a result of performing nearest neighbor search in the StyleGAN feature space according to an embodiment of the present disclosure.

The first column of FIG. 5 shows search spaces. The second column shows images rearranged by warping the color images $c_r$ for pixel locations u' of a normal face image. The third column shows labels rearranged by warping the segmentation map images $s_r$ for pixel locations u' of a normal face image. The fourth column shows images rearranged by warping the normal map images $n_r$ for pixel locations u' of a normal face image.

The first row is an example using RGB patches, the second row is an example using VGG features, and the third row is an example using StyleGAN features.

When people observe a stylized face portrait, they may easily infer a basic geometric structure of the face with little effort. Although the overall ratio of facial components may vary significantly, people may associate local regions of the stylized portrait with real regions. For example, even when the eyes of a stylized picture of a person are significantly larger than real eyes, people may set a perceptual correspondence between the stylized eyes and the real eyes by perceiving the positions, sizes, and visual characteristics of eyelids.

Such an observation means that a 3D surface for a stylized face portrait may be configured by utilizing prior knowledge about a normal facial shape. That is, although the same prior work on the mapping from a local visual shape to a 3D local geometry may be shared between a normal face and a stylized face, arrangement of the local geometry may vary according to the overall ratio of the facial components.

In the present disclosure, the observation described above may be applied to construct 3D surfaces of a normal face and a stylized face by defining a shared mapping from StyleGAN features to a 3D local geometry. In image synthesis, the StyleGAN features may determine the shape and arrangement of facial components. In addition, each StyleGAN layer may participate in independent synthesis (e.g., style mixing), and the role of each StyleGAN layer may be maintained even after fine tuning for different domains as can be seen in layer swapping. Therefore, a hypothesis that features of each StyleGAN layer have common characteristics regardless of the domain is applied in the present disclosure.

Based on the hypothesis, the present disclosure may define a per-pixel StyleGAN feature vector in the StyleGAN feature map pyramid Fpyr=$\{F_1, F_2, \ldots, F_{18}\}$. At this point, each layer may correspond to the index for the first dimension of the W+ spatial latent code $w \in \mathbb{R}^{18\times512}$.

To obtain a per-pixel feature vector at a given pixel location, the size of each feature map in the pyramid may be adjusted to the output image size using bilinear interpolation. Then, features at the pixel locations of all layers may be linked and normalized.

FIGS. 4 and 5 may show that StyleGAN feature vectors of pixel units are associated with the visual shape, meaning, and 3D geometry of each local region between a normal face and a stylized face in a consistent manner.

Nearest neighbor search may be performed to confirm inter-domain compatibility of the per-pixel StyleGAN feature vector. For example, for each pixel of a target stylized face image, the pixel may be linked to the closest feature distance of the normal face image. Using the nearest neighbor field, the normal face image and the semantic and normal maps of the normal face image may be warped. Referring to FIG. 5, it can be seen that the warping result provides a plausible configuration of the visual, semantic, and geometric information of the stylized face image.

When feature vector $v_r$ of a normal face and feature vector $v_s$ of a stylized face are given, the color image $c_r$ of the normal face may be distorted using the nearest neighbor search.

Equation 4 for the warping result image $c_s$ is as shown below.

$$c_s(u) = c_r(\operatorname*{argmin}_{u'} \| v_r(u') - v_s(u)\|_2^2) \quad \text{[Equation 4]}$$

At this point, u and u' may represent pixel locations in the stylized face image and the normal face image, respectively.

It can be seen that the distorted result image $c_s$ shown in the second row of the second column of FIG. 5 looks very similar to the original color image of the stylized face shown in the second column of FIG. 4.

Warping for the segmentation map image $s_r$ and the normal map image $n_r$ of a normal face may also be performed in a similar manner. In this case, although the original segmentation and normal maps to be compared are not shown, referring to FIGS. 4 and 5, it can be seen that a plausible segmentation is shown and a normal map can be obtained for the stylized face. In addition, referring to FIG. 5, a warping result using other possible per-pixel features such as RGB patches and VGG features can be confirmed. It can be confirmed that the StyleGAN feature vector outperforms conventional models from the aspect of inter-domain compatibility between the normal face and the stylized face.

The results of experiment shown in FIG. 4 and FIG. 5 largely have two meanings. First, the StyleGAN features of the two StyleGAN models may be compatible when the models are finely tuned appropriately like the Toonify. Second, the StyleGAN features may encode local geometric information based on rich semantic understanding. For example, the segmentation map of the StyleGAN features shows that all the stylized facial geometric structures come from corresponding facial components of a normal face. In addition, referring to FIG. 5, a normal map obtained through warping especially on the stylized face shows a solid geometric structure for exaggerated facial components.

Figure 6:
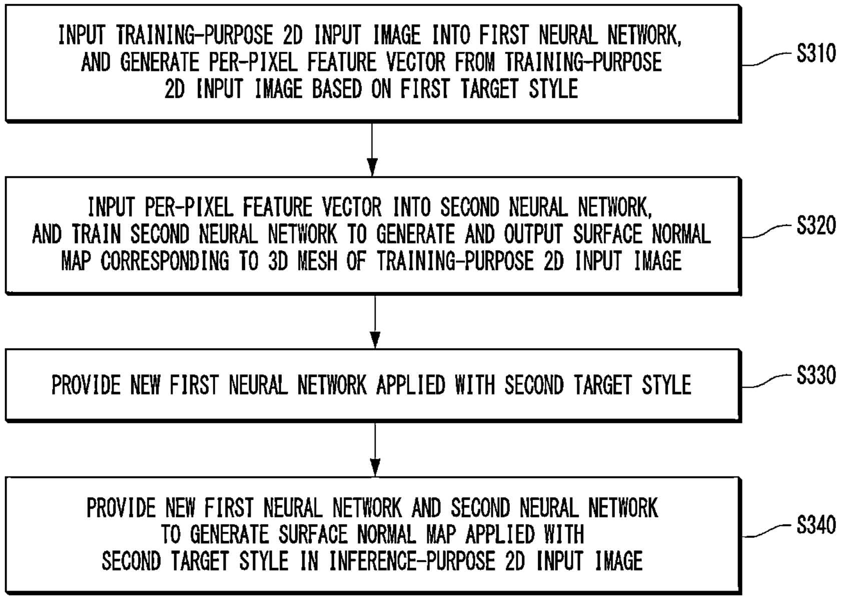
FIG. 6 is a flowchart illustrating a process of training a stylized 3D mesh generation device according to an embodiment of the present disclosure.

FIG. 6 is a flowchart illustrating a process of training a stylized 3D mesh generation device according to an embodiment of the present disclosure.

Hereinafter, it will be described with reference to FIG. 1 and FIG. 6 together.

At step S310, a training-purpose 2D input image 212 is input into the first neural network 110, and a per-pixel feature vector 232 may be generated from the training-purpose 2D input image 212 based on a first target style. At this point, the first target style may be a normalized style. For example, the normalized style may be a style that reflects changes in hair color, age, and the like. At this point, the first neural network 110 may be a neural network that has already completed the training.

At step S320, the per-pixel feature vector 232 is input into the second neural network 120, and the second neural network 120 may be trained to generate and output a surface normal map 252 corresponding to the 3D mesh of the training-purpose 2D input image.

At this point, the step of training the second neural network 120 may be a step of inputting the per-pixel feature vector 232 into the second neural network 120, and training the second neural network 120 to output the surface normal map 252 using a surface normal map rendered for the previously prepared training-purpose 2D input image 212 (e.g., see the first row of FIG. 2) as a ground-truth label (e.g., see the last row of FIG. 2).

At this point, a step of inputting images 214 and 216 having lighting conditions different from each other into the first neural network 110, and generating a per-pixel second feature vector 234 or 236 of the training-purpose 2D input image 212 for each of the images 214 and 216 may be further performed.

At this point, step S320 may be a step of inputting the per-pixel feature vector 232 and the per-pixel second feature vectors 234 and 236 into the second neural network 120, and training the second neural network 120 to generate and output the surface normal maps 252 and 254.

For example, at the step of repeating the training of step S320, each step may include following sub-steps.

At a first sub-step, the second neural network 120 may calculate the loss function $L_{normal}$ (equation 1) by using, for example, the surface normal map 252 that is output by receiving the feature vector 232 in the natural light.

At a second sub-step, the second neural network 120 may receive, for example, a second feature vector 234 for a first lighting direction, and output a surface normal map 254.

At a third sub-step, the second neural network 120 may receive, for example, a second feature vector 236 for a second lighting direction, and output a surface normal map (not shown).

At a fourth sub-step, a consistency loss function $L_{consistent}$ (equation 2) may be calculated using the surface normal map 254 for the first lighting direction and the surface normal map (not shown) for the second lighting direction.

At a fifth sub-step, the final loss (equation 3) may be calculated using the loss $L_{normal}$ and the consistency loss $L_{consistent}$, and the calculated value may be applied (back propagation) to the second neural network 120. For example, the final loss may be calculated by differentiating a value obtained by adding the loss $L_{normal}$ and the consistency loss $L_{consistent}$.

At step S330, a new first neural network applied with a second target style may be provided. At this point, the new first neural network may be provided by finely tuning the first neural network 110 to apply the second target style, which is any one among animation, cartoon, caricature, or a special painting style.

At step S340, the new first neural network and second neural network 120 may be provided to generate a surface normal map applied with the second target style in the inference-purpose 2D input image.

Figure 7:
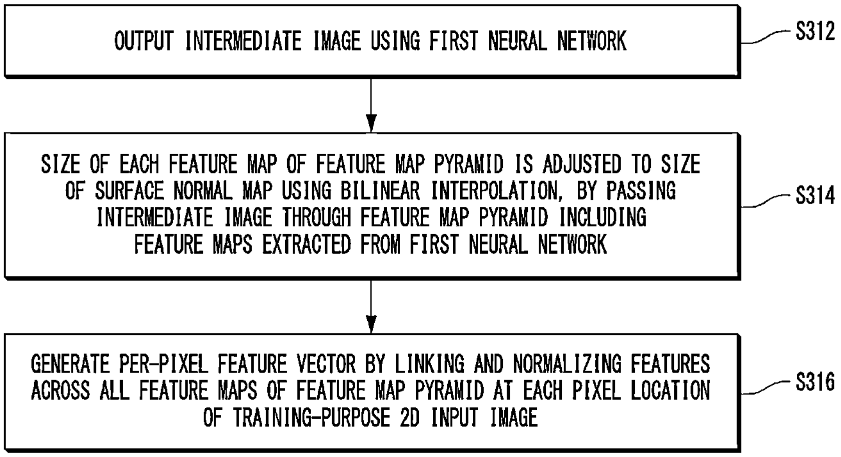
FIG. 7 is a flowchart illustrating a process of generating a per-pixel feature vector according to an embodiment of the present disclosure.

FIG. 7 is a flowchart illustrating a process of generating a per-pixel feature vector according to an embodiment of the present disclosure.

Hereinafter, it will be described with reference to FIG. 1, FIG. 6, and FIG. 7 together.

At step S312, an intermediate image may be output using the first neural network 110.

At step S314, the size of each feature map of the feature map pyramid 142 may be adjusted to the size of the surface normal map (output image) using bilinear interpolation, by passing the intermediate image through the feature map pyramid 142 including feature maps extracted from the first neural network 110.

At step S316, the per-pixel feature vector 232 may be generated by linking and normalizing features across all feature maps of the feature map pyramid 142 at each pixel location of the training-purpose 2D input image.

Figure 8:
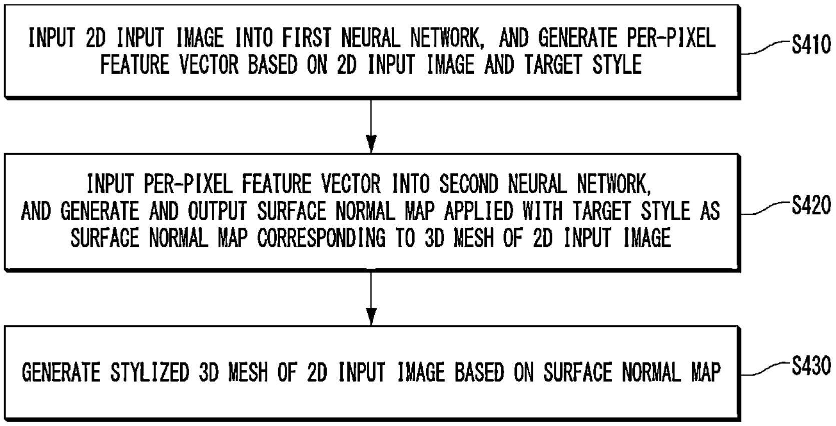
FIG. 8 is a flowchart illustrating an inference method for generating a stylized 3D mesh according to an embodiment of the present disclosure.

FIG. 8 is a flowchart illustrating an inference method for generating a stylized 3D mesh according to an embodiment of the present disclosure.

At step S410, a 2D input image may be input into the first neural network, and a per-pixel feature vector may be generated based on the 2D input image and a target style. At this point, the target style may be any one style among animation, cartoon, caricature, or a special painting style. At this point, the process of generating the per-pixel feature vector may be the same as the process described through FIG. 7.

At step S420, the per-pixel feature vector may be input into the second neural network, and the surface normal map applied with the target style may be generated and output as a surface normal map corresponding to the 3D mesh of the 2D input image. At this point, the second neural network may be a neural network that has learned a function of generating a surface normal map corresponding to the 3D mesh of the 2D input image when the first neural network generates a per-pixel feature vector based on a training-purpose target style, which is a normalized style.

At this point, the second neural network may be trained to generate a per-pixel second feature vector of the 2D input image for each of the images by inputting images having lighting conditions different from each other into a training-purpose first neural network different from the first neural network, and generate and output the surface normal map by inputting the per-pixel feature vector and the per-pixel second feature vector into the second neural network.

At step S430, a stylized 3D mesh of the 2D input image may be generated based on the surface normal map.

In the step thereafter, a 3D image may be generated by rendering the full-head 3D object. For example, the 3D image may be utilized as an input for an existing 3D facial expression manipulation plug-in. For example, a full-head 3D image, reflecting the person's facial movement and expression in real time, may be provided. Although the face is described in the present embodiment, movement of the entire body may also be reflected in the 3D image in real time.

Figure 9:
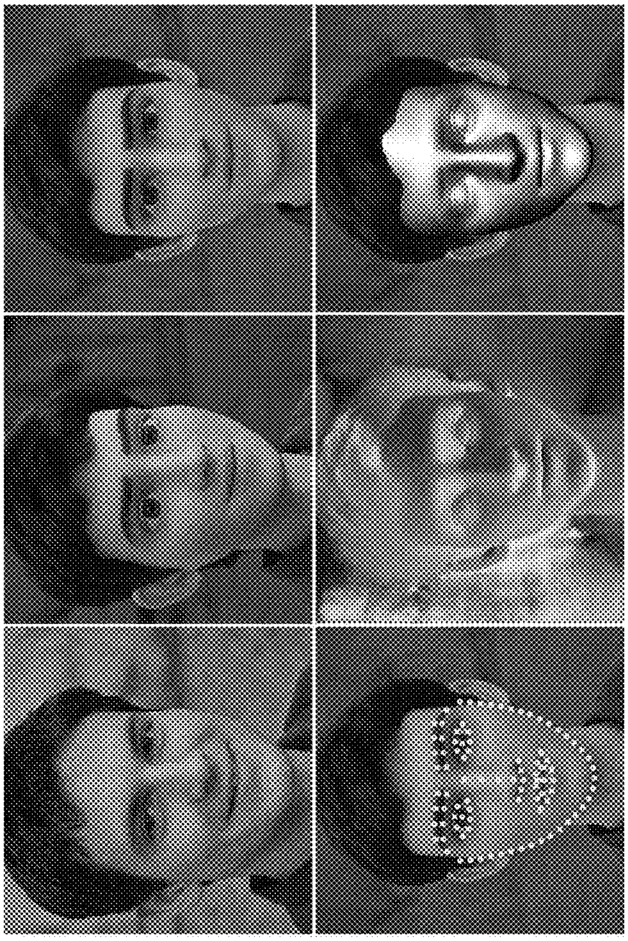
FIG. 9 is a view for explaining a process of generating a depth map for a face region from an input image according to an embodiment of the present disclosure.
Figure 10:
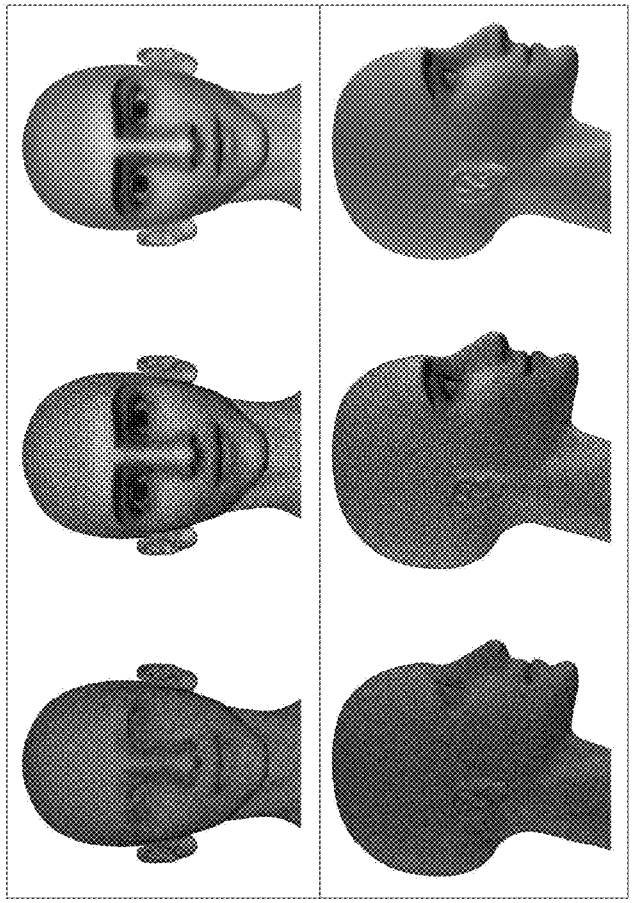
FIG. 10 is a view for explaining a result of generating a full-head 3D stylized face according to an embodiment of the present disclosure.

FIG. 9 is a view for explaining a process of generating a depth map for a face region from an input image according to an embodiment of the present disclosure.

FIG. 10 is a view for explaining a result of generating a full-head 3D stylized face according to an embodiment of the present disclosure.

Figure 11:
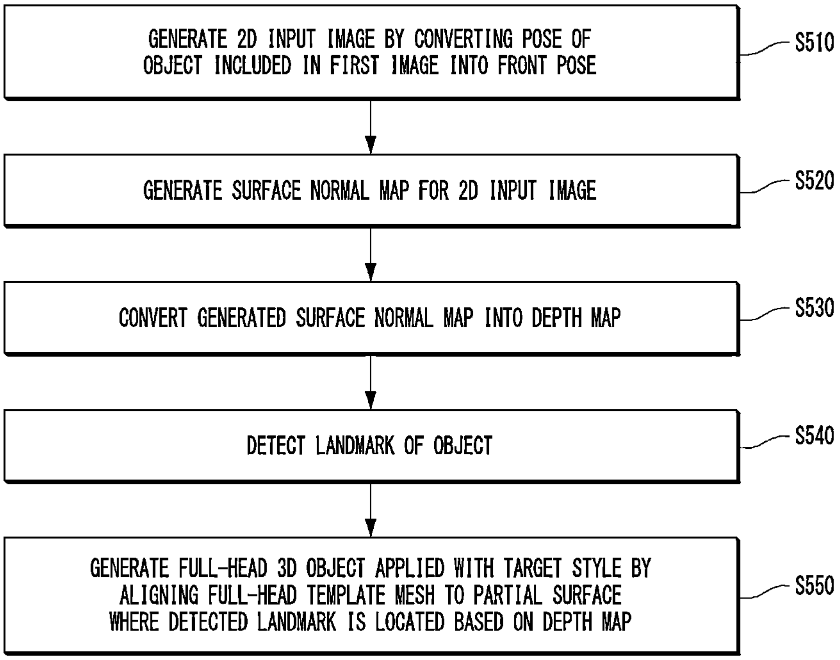
FIG. 11 is a flowchart illustrating a process of generating a full-head 3D stylized face and a 3D image from an input image according to an embodiment of the present disclosure.

FIG. 11 is a flowchart illustrating a process of generating a full-head 3D stylized face and a 3D image from an input image according to an embodiment of the present disclosure.

Hereinafter, it will be described with reference to FIGS. 9 to 11 together.

At step S510, the 2D input image may be generated by converting a pose of an object included in the first image (see the first image in the first column of FIG. 9) into a front pose. For example, the output of the first neural network for the first image may be the same as the first image in the second column of FIG. 9, and the output of the first neural network for the 2D input image may be the same as the first image in the third column of FIG. 9.

At step S520, a surface normal map for the 2D input image may be generated. For example, the surface normal map image may be the same as the second image in the second column of FIG. 9.

At step S530, the generated surface normal map may be converted into a depth map. For example, the converted depth map image may be the same as the second image in the third column of FIG. 9. At this point, the conversion may be accomplished by performing normal integration on the face region. At this point, the 3D information of the depth map may only have information corresponding to the skin of the face region, not the full head.

At step S540, a landmark of the object may be detected. For example, step S530 may be a step of detecting a landmark of an object included in the image, in which the target style is reflected, as the output image of the first neural network. For example, the image in a result of detecting a landmark of the object may be the same as the second image of the first column of FIG. 9. At this point, when step S540 is a step prior to step S550, the execution order may not matter. For example, step S540 may be separately performed between step S510 and step S520.

At step S550, a full-head 3D object applied with the target style may be generated as a 3D mesh by non-rigidly aligning a full-head template mesh to a partial surface where the detected landmark is located based on the depth map. For example, the generated full-head 3D object image may be like the images shown in the first column of FIG. 10. When a texture is added to the full-head 3D objects shown in the first column of FIG. 10, it may be like the images shown in the second column. When the wire frame is removed from the images shown in the second column, it may be like the images shown in the third column. Preferably, the 3D mesh generated by the 3D mesh generation device may be like the images shown in the third column of FIG. 10.

The 3D mesh generation device of the present disclosure may generate a full-head stylized 3D avatar by using an actual photograph or an image generated from Toonify as an input. The generated avatar may be used in an actual application program by attaching various 3D assets according to user's preference. For example, hair, clothes, or the like may be attached to the full-head 3D object according to user's preference.

Figure 12:
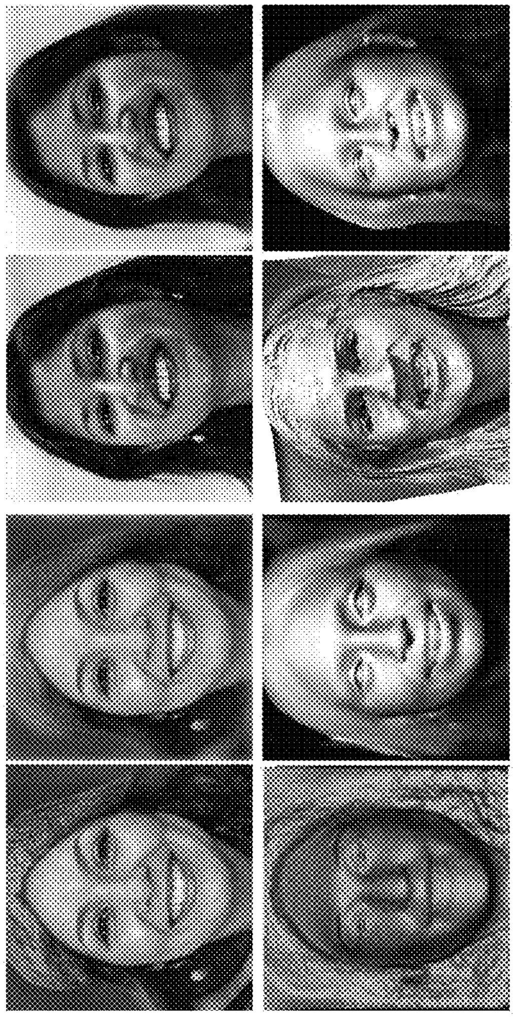
FIG. 12 is a view showing an example of quality comparison with conventional technology according to an embodiment of the present disclosure.

FIG. 12 shows an example of comparing quality with that of a prior art according to an embodiment of the present disclosure.

The first and second images in the first column respectively show an input image and an output image of 3D-lifting GAN in the conventional technique. The 3D-lifting GAN may perform unsupervised 3D-lifting on the 2D GAN.

The first image and the second image in each of the second column and the fourth column represent the output image of the first neural network of the 3D mesh generation device of the present disclosure and the shading image (graysale image) using the surface normal map output from the second neural network. For example, although the image in the first row of the first column may be input into the 3D mesh generation device of the present disclosure, the output image of the first neural network through GAN inversion may show a blur effect like the first row of the second column. When the feature vector generated through the output image of the first neural network, in which the blur effect is reflected, is input into the second neural network of the present disclosure, an output image showing a clean geometric structure of the face like the second row of the second column can be obtained. Therefore, it can be seen that a feature vector that mimics well the input image (i.e., the input of the second neural network) has been effectively generated.

The first image and the second image in the third column represent the input and output images of EG3D in the conventional technique. The EG3D may be a GAN for a volumetric radiance field.

Each output image is generated by applying GAN inversion to a normal face image and visualizing the result as a shaded image to compare geometric quality one to one.

The 3D-lifting GAN shows a geometric structure of a surface that is too smooth, and the EG3D shows a geometric structure of a surface that is too rough. On the contrary, it can be seen that the surface of the output image of the present disclosure shows a neater geometric structure for the facial components.

Figure 13:
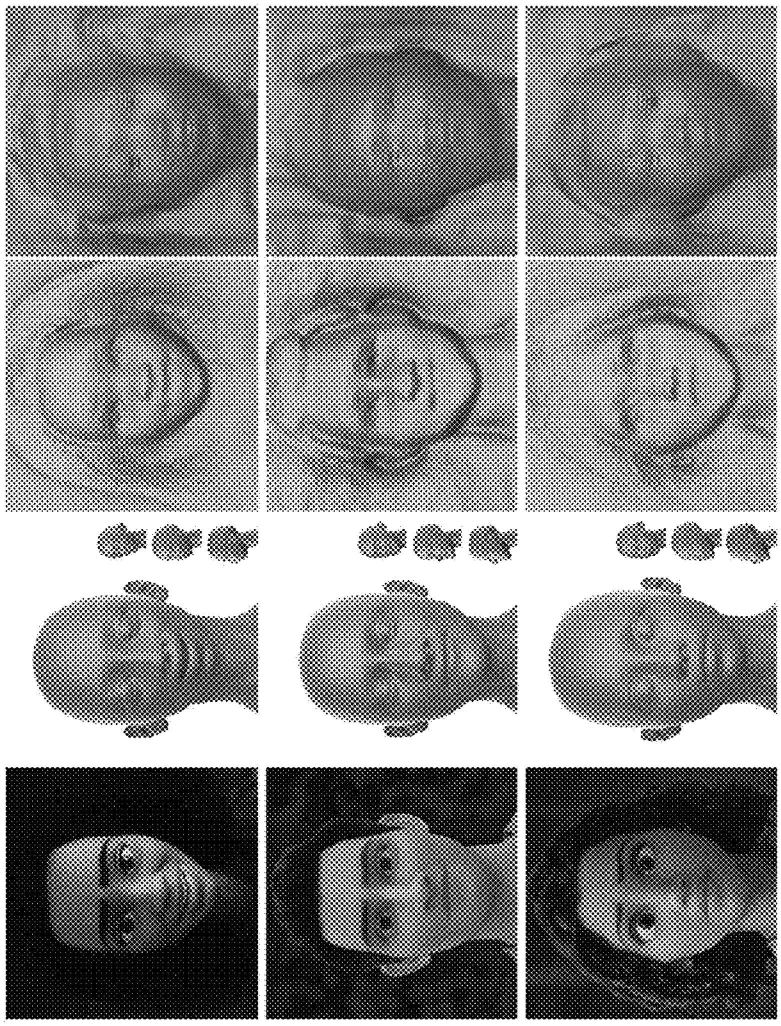
FIG. 13 is a view for explaining a qualitative comparison with a conventional 3D-aware GAN applied to a stylized face domain according to an embodiment of the present disclosure.

FIG. 13 is a view for explaining a qualitative comparison with a conventional 3D-aware GAN applied to a stylized face domain according to an embodiment of the present disclosure.

The first column shows input images, the second column shows output images (3D mesh) applied with the present disclosure, the third column shows output images of EG3D of the conventional 3D-aware GAN, and the fourth column shows output images of Dr.3D of the conventional 3D-aware GAN.

For the conventional techniques of EG3D and Dr.3D, a 3D facial shape is acquired by finely tuning each model with a cartoon face dataset and performing GAN inversion on the input image.

The conventional 3D-aware GAN usually generates flat or blurry shapes. That is, the 3D surface of the conventional 3D-aware GAN tends to generate rough shapes based on representation of estimated depth or volume. Although such rough shapes of the prior art are suitable for synthesizing three-dimensionally consistent images, their utilization in generating 3D mesh models for avatars is limited. Particularly, it is due to lack of fine shape features such as the area around the eyes and nose.

On the contrary, it can be seen that the 3D mesh generation method according to the present disclosure generates a clear shape of the facial components. That is, the 3D mesh generation method of the present disclosure generates a clean facial surface that allows further accurate facial identity awareness based on geometry. As a result, such a surface is more suitable for registration of visually good non-rigid template meshes.

According to the present disclosure, compared to conventional frameworks (e.g., pix2vertex or the like) that require large-scale training data, the present disclosure may achieve more accurate surface normal estimation with limited training datasets. The present disclosure may effectively solve the problem of incorrectly set normal estimation by utilizing StyleGAN features containing rich semantic and geometric information.

The second neural network described above may be trained in units of pixels. Since a single image contains about 300,000 pixels in the face region, the second neural network may be effectively trained using a large amount of pixel-unit pair data even with a small number of face images.

Figure 14:
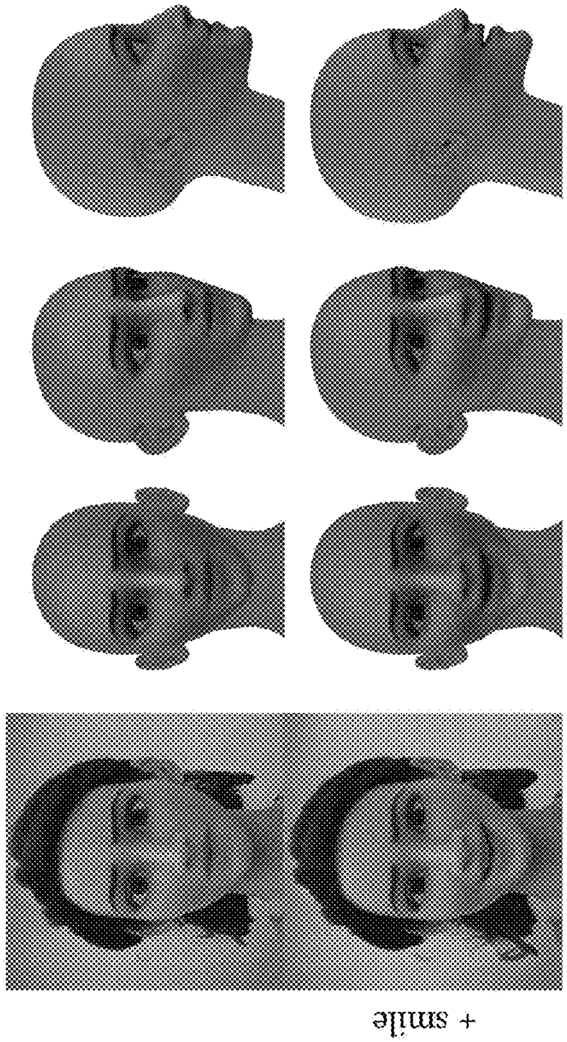
FIG. 14 is a view for explaining an example of editing facial expressions according to an embodiment of the present disclosure.

FIG. 14 is a view for explaining an example of editing facial expressions according to an embodiment of the present disclosure.

According to the present disclosure, an automated pipeline capable of transforming a 2D output of Toonify into a 3D full-head stylized face can be provided. When the pipeline is used as a bridge between a 2D GAN and a 3D mesh, 3D-shape editing based on semantic manipulation in the GAN latent space is also possible.

For example, 3D facial expression editing from a blank expression to a smiling expression is possible as shown in FIG. 14.

The 3D modeling of the present disclosure based on a rich 2D appearance model may be provided as an extensive toolkit for authoring stylized 3D faces.

Characterized faces of a user may be provided on a smartphone using a 3D mesh generated according to the embodiments of the present disclosure. That is, a function or application for producing user's own 3D emoticons using a user's profile picture can be provided. For example, the 3D mesh generation model of the present disclosure may be installed and utilized in a 3D editing program and a game engine (e.g., Unreal engine, Unity, or the like). Through this, a user's face image may be converted into a user's 3D stylized face mesh and provided to the user with one click.

Figure 15:
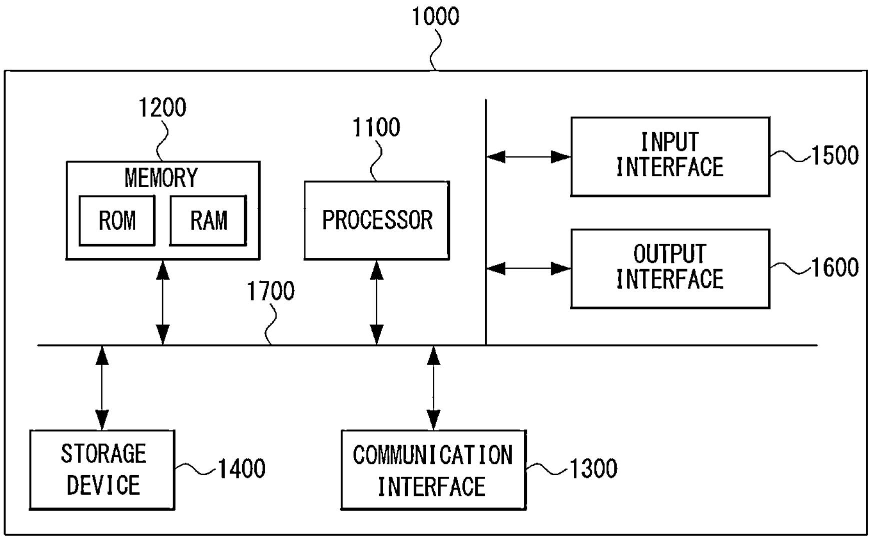
FIG. 15 is a conceptual view showing an example of a normalized and stylized 3D mesh generation device or a computing system capable of performing at least some of the processes shown in FIGS. 1 to 14.

FIG. 15 is a conceptual view showing an example of a normalized and stylized 3D mesh generation device or a computing system capable of performing at least some of the processes shown in FIGS. 1 to 14.

At least some of the processes of the training and inference method for generating a stylized 3D mesh according to an embodiment of the present disclosure may be executed by the computing system 1000 shown in FIG. 15.

Referring to FIG. 15, the computing system 1000 according to an embodiment of the present disclosure may be configured to include a processor 1100, a memory 1200, a communication interface 1300, a storage device 1400, an input interface 1500, an output interface 1600, and a bus 1700.

The computing system 1000 according to an embodiment of the present disclosure may include at least one processor 1100 and a memory 1200 for storing instructions that instruct the at least one processor 1100 to perform at least one step. At least some steps of the method according to an embodiment of the present disclosure may be performed as the at least one processor 1100 loads instructions from the memory 1200 and executes the instructions.

The processor 1100 may mean a central processing unit (CPU), a graphics processing unit (GPU), or a dedicated processor on which the methods according to the embodiments of the present disclosure are performed.

Each of the memory 1200 and the storage device 1400 may be configured using at least one among a volatile storage medium and a nonvolatile storage medium. For example, the memory 1200 may be configured using at least one among read-only memory (ROM) and random-access memory (RAM).

In addition, the computing system 1000 may include the communication interface 1300 that performs communication through a wireless network.

In addition, the computing system 1000 may further include a storage device 1400, an input interface 1500, an output interface 1600, and the like.

In addition, the components included in the computing system 1000 may be connected through the bus 1700 and communicate with each other.

The computing system 1000 of the present disclosure may be, for example, a desktop computer, a laptop computer, a notebook computer, a smart phone, a tablet PC, a mobile phone, a smart watch, a smart glass, an e-book reader, a portable multimedia player (PMP), a portable game console, a navigation device, a digital camera, a digital multimedia broadcasting (DMB) player, a digital audio recorder, a digital audio player, a digital video recorder, a digital video player, a Personal Digital Assistant (PDA), or the like.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A stylized 3D mesh generation device, comprising:
- a memory for storing at least one or more instructions;
- a processor for executing the at least one or more instructions;
- a first neural network for generating a per-pixel feature vector based on a 2D input image and a target style; and
- a second neural network for generating a surface normal map corresponding to a 3D mesh of the 2D input image based on the per-pixel feature vector, wherein
- the processor generates a stylized 3D mesh of the 2D input image based on the surface normal map, and the second neural network generates and outputs the surface normal map applied with the target style based on the per-pixel feature vector.

2. The stylized 3D mesh generation device according to claim 1, wherein when training of the second neural network is performed, the first neural network generates the per-pixel feature vector based on a first target style, and the first target style is applied to the generated surface normal map.

3. The stylized 3D mesh generation device according to claim 2, wherein when inference of the second neural network is performed, the first neural network generates the per-pixel feature vector based on a second target style, and the second target style is applied to the generated surface normal map.

4. The stylized 3D mesh generation device according to claim 3, wherein the first target style is a normalized style, and the second target style is any one among animation, cartoon, caricature, or a special painting style.

5. The stylized 3D mesh generation device according to claim 1, further comprising, between the first neural network and the second neural network, a feature map pyramid including feature maps extracted from the first neural network, wherein the processor adjusts a size of each feature map of the feature map pyramid to a size of the surface normal map using bilinear interpolation, and the processor generates the per-pixel feature vector by linking and normalizing features across all feature maps of the feature map pyramid at each pixel location of the 2D input image.

6. The stylized 3D mesh generation device according to claim 2, wherein the first neural network further receives images having lighting conditions different from each other, and generates a per-pixel second feature vector of the 2D input image for each of the images, and the second neural network generates a surface normal map corresponding to the 3D mesh of the 2D input image based on the per-pixel feature vector and the per-pixel second feature vector.

7. The stylized 3D mesh generation device according to claim 1, wherein the 2D input image is generated by converting a pose of an object included in a first image into a front pose, and the processor converts the generated surface normal map of the object into a depth map, detects a landmark of the object, and generates a full-head 3D object applied with the target style by aligning a full-head template mesh to a partial surface where the detected landmark is located, based on the depth map.

8. The stylized 3D mesh generation device according to claim 1, wherein the processor generates a stylized 3D image of the 2D input image by rendering the 3D mesh.

9. A training method for generating a stylized 3D mesh, the method comprising the steps of:
- inputting a training-purpose 2D input image into a first neural network, and generating a per-pixel feature vector from the training-purpose 2D input image based on a first target style;
- inputting the per-pixel feature vector into a second neural network, and training the second neural network to generate and output a surface normal map corresponding to a 3D mesh of the training-purpose 2D input image;
- providing a new first neural network applied with a second target style; and providing the new first neural network and second neural network to generate a surface normal map applied with the second target style in an inference-purpose 2D input image.

10. The training method for generating a stylized 3D mesh according to claim 9, wherein the first target style is a normalized style.

11. The training method for generating a stylized 3D mesh according to claim 9, wherein the new first neural network is provided by finely tuning the first neural network to apply the second target style, which is any one among animation, cartoon, caricature, or a special painting style.

12. The training method for generating a stylized 3D mesh according to claim 9, wherein the step of generating a per-pixel feature vector includes the steps of:

outputting an intermediate image using the first neural network;

adjusting a size of each feature map of a feature map pyramid to a size of the surface normal map using bilinear interpolation, by passing the intermediate image through the feature map pyramid including feature maps extracted from the first neural network; and generating the per-pixel feature vector by linking and normalizing features across all feature maps of the feature map pyramid at each pixel location of the training-purpose 2D input image.

13. The training method for generating a stylized 3D mesh according to claim 9, further comprising the step of inputting images having lighting conditions different from each other into the first neural network and generating a per-pixel second feature vector of the training-purpose 2D input image for each of the images, wherein the step of training the second neural network is a step of training to generate and output the surface normal map by inputting the per-pixel feature vector and the per-pixel second feature vector into the second neural network.

14. The training method for generating a stylized 3D mesh according to claim 9, wherein the step of training the second neural network is a step of inputting the per-pixel feature vector into the second neural network, and training the second neural network to output the surface normal map using a surface normal map rendered for the previously prepared training-purpose 2D input image as a ground-truth label.

15. An inference method for generating a stylized 3D mesh, the method comprising the steps of:

inputting a 2D input image into a first neural network, and generating a per-pixel feature vector based on the 2D input image and a target style;

inputting the per-pixel feature vector into a second neural network, and generating and outputting the surface normal map applied with the target style as a surface normal map corresponding to a 3D mesh of the 2D input image; and generating a stylized 3D mesh of the 2D input image based on the surface normal map.

16. The inference method for generating a stylized 3D mesh according to claim 15, wherein the second neural network is a neural network that has been trained a function of generating a surface normal map corresponding to the 3D mesh of the 2D input image when the first neural network generates a per-pixel feature vector based on a training-purpose target style, which is a normalized style.

17. The inference method for generating a stylized 3D mesh according to claim 15, wherein the target style is any one style among animation, cartoon, caricature, or a special painting style.

18. The inference method for generating a stylized 3D mesh according to claim 15, wherein the step of generating a per-pixel feature vector includes the steps of:

outputting an intermediate image using the first neural network;

adjusting a size of each feature map of a feature map pyramid to a size of the surface normal map using bilinear interpolation, by passing the intermediate image through the feature map pyramid including feature maps extracted from the first neural network; and generating the per-pixel feature vector by linking and normalizing features across all feature maps of the feature map pyramid at each pixel location of the 2D input image.

19. The inference method for generating a stylized 3D mesh according to claim 15, further comprising the step of generating the 2D input image by converting a pose of an object included in a first image into a front pose, and the step of generating a 3D mesh includes the steps of:

converting the generated surface normal map into a depth map;

detecting a landmark of the object; and generating a full-head 3D object applied with the target style by aligning a full-head template mesh to a partial surface where the detected landmark is located, based on the depth map.

20. The inference method for generating a stylized 3D mesh according to claim 19, further comprising the step of generating a 3D image by rendering the full-head 3D object.

* * * * *